United States Patent
Tomizawa

(10) Patent No.: US 12,084,126 B2
(45) Date of Patent: Sep. 10, 2024

(54) MOTOR DRIVE SYSTEM

(71) Applicant: DENSO CORPORATION, Kariya (JP)

(72) Inventor: Hiroki Tomizawa, Kariya (JP)

(73) Assignee: DENSO CORPORATION, Kariya (JP)

(*) Notice: Subject to any disclaimer, the term of this patent is extended or adjusted under 35 U.S.C. 154(b) by 323 days.

(21) Appl. No.: 17/660,814

(22) Filed: Apr. 26, 2022

(65) Prior Publication Data

US 2022/0250677 A1    Aug. 11, 2022

Related U.S. Application Data

(63) Continuation of application No. PCT/JP2020/039047, filed on Oct. 16, 2020.

(30) Foreign Application Priority Data

Oct. 31, 2019  (JP) ................................ 2019-199400

(51) Int. Cl.
  *B62D 5/04*   (2006.01)
(52) U.S. Cl.
  CPC ......... *B62D 5/0493* (2013.01); *B62D 5/0463* (2013.01); *B62D 5/0484* (2013.01)
(58) Field of Classification Search
  CPC ...... B62D 5/04; B62D 5/0409; B62D 5/0418; B62D 5/046; B62D 5/0463; B62D 5/0481; B62D 5/0484; B62D 5/0487; B62D 5/0493; H02P 5/46; H02P 29/024; H02P 29/028
  See application file for complete search history.

(56) References Cited

U.S. PATENT DOCUMENTS

| | | | |
|---|---|---|---|
| 2018/0086369 A1* | 3/2018 | Yanagi | B62D 5/003 |
| 2018/0178835 A1* | 6/2018 | Toko | B62D 5/0481 |
| 2018/0208236 A1* | 7/2018 | Asao | H02P 29/0241 |
| 2022/0352833 A1* | 11/2022 | Gourari | B60L 3/0092 |

FOREIGN PATENT DOCUMENTS

| | | | |
|---|---|---|---|
| JP | 2004338563 A | * | 12/2004 |
| JP | 2009-029284 A | | 2/2009 |
| JP | 4848717 B2 | | 12/2011 |

OTHER PUBLICATIONS

English translation of JP 2004338563 (Year: 2004).*

* cited by examiner

*Primary Examiner* — Russell Frejd
*Assistant Examiner* — Brandon Z Willis
(74) *Attorney, Agent, or Firm* — MASCHOFF BRENNAN

(57) ABSTRACT

A motor drive system includes a first actuator and a second actuator each functioning as a motor configured to output torque. Each of the first actuator and the second actuator includes a plurality of control calculation units and a plurality of motor drive units. The plurality of control calculation units are provided redundantly and each configured to perform a calculation related to a motor drive control. The plurality of motor drive units are provided redundantly and each configured to drive based on a drive signal generated by a corresponding control calculation unit and output the torque.

7 Claims, 13 Drawing Sheets

[FIRST EMBODIMENT]

TYPE <Y>: WHEN COMMUNICATION BETWEEN A1 AND B1 IS INTERRUPTED

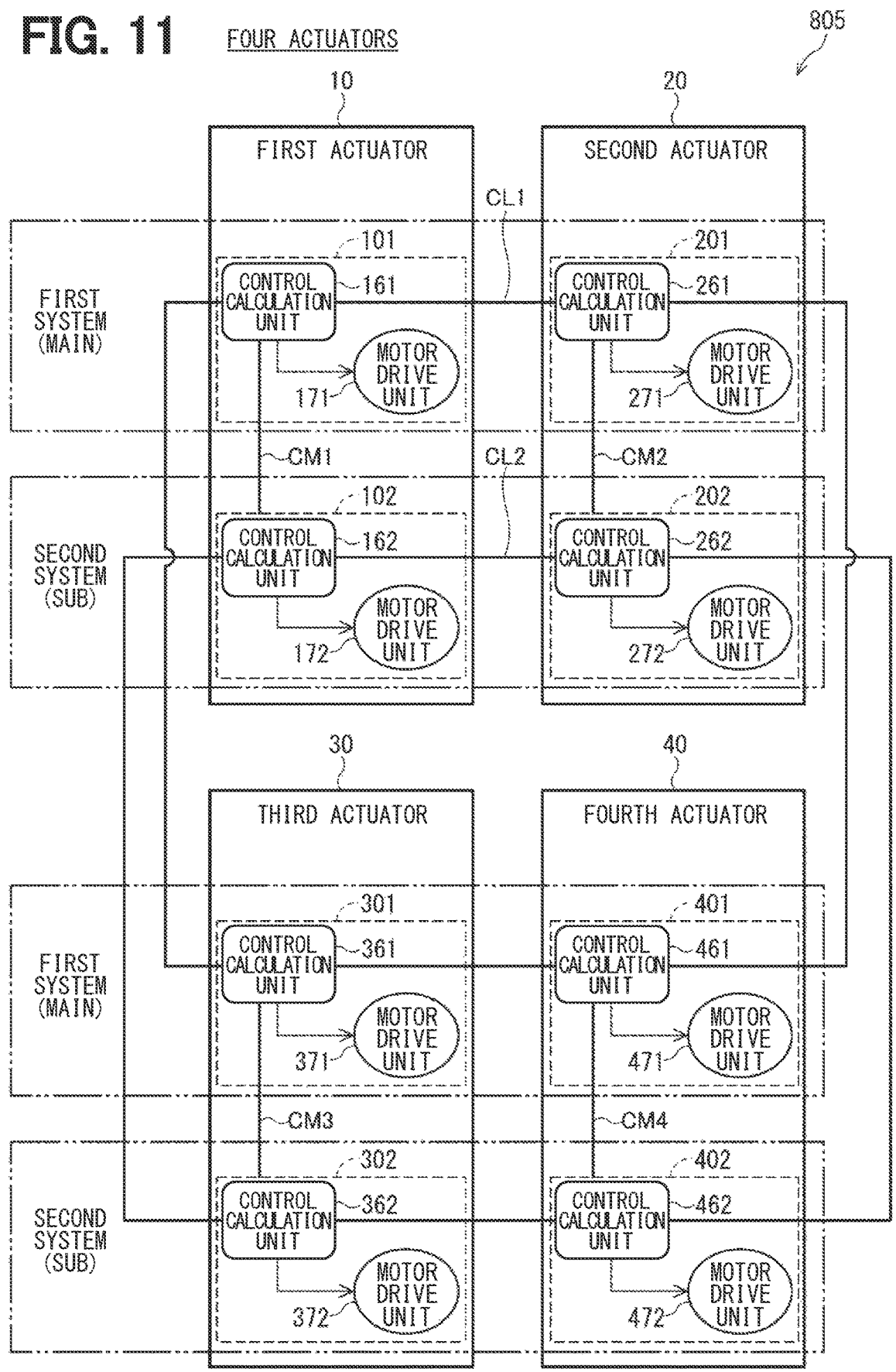
FIG. 11  FOUR ACTUATORS

MOTOR DRIVE SYSTEM

CROSS REFERENCE TO RELATED APPLICATIONS

The present application is a continuation application of International Patent Application No. PCT/JP2020/039047 filed on Oct. 16, 2020, which designated the U.S. and claims the benefit of priority from Japanese Patent Application No. 2019-199400 filed on Oct. 31, 2019. The entire disclosures of all of the above applications are incorporated herein by reference.

TECHNICAL FIELD

The present disclosure relates to a motor drive system.

BACKGROUND

In motor drive systems in which a motor is generally driven, a configuration is conventionally known in which multiple control calculation units, each performing calculation related to motor drive, and multiple motor drive units, each driven on the basis of a drive signal generated by the control calculation unit, are provided redundantly.

SUMMARY

The present disclosure provides a motor drive system. The motor drive system includes a first actuator and a second actuator each functioning as a motor configured to output torque. Each of the first actuator and the second actuator includes a plurality of control calculation units and a plurality of motor drive units. The plurality of control calculation units are provided redundantly and each configured to perform a calculation related to a motor drive control. The plurality of motor drive units are provided redundantly and each configured to drive based on a drive signal generated by a corresponding control calculation unit and output the torque.

BRIEF DESCRIPTION OF DRAWINGS

The features and advantages of the present disclosure will become more apparent from the following detailed description made with reference to the accompanying drawings. In the drawings:

FIG. 11 is a schematic diagram of a motor drive system according to a fifth embodiment;

DETAILED DESCRIPTION

Figure 1:
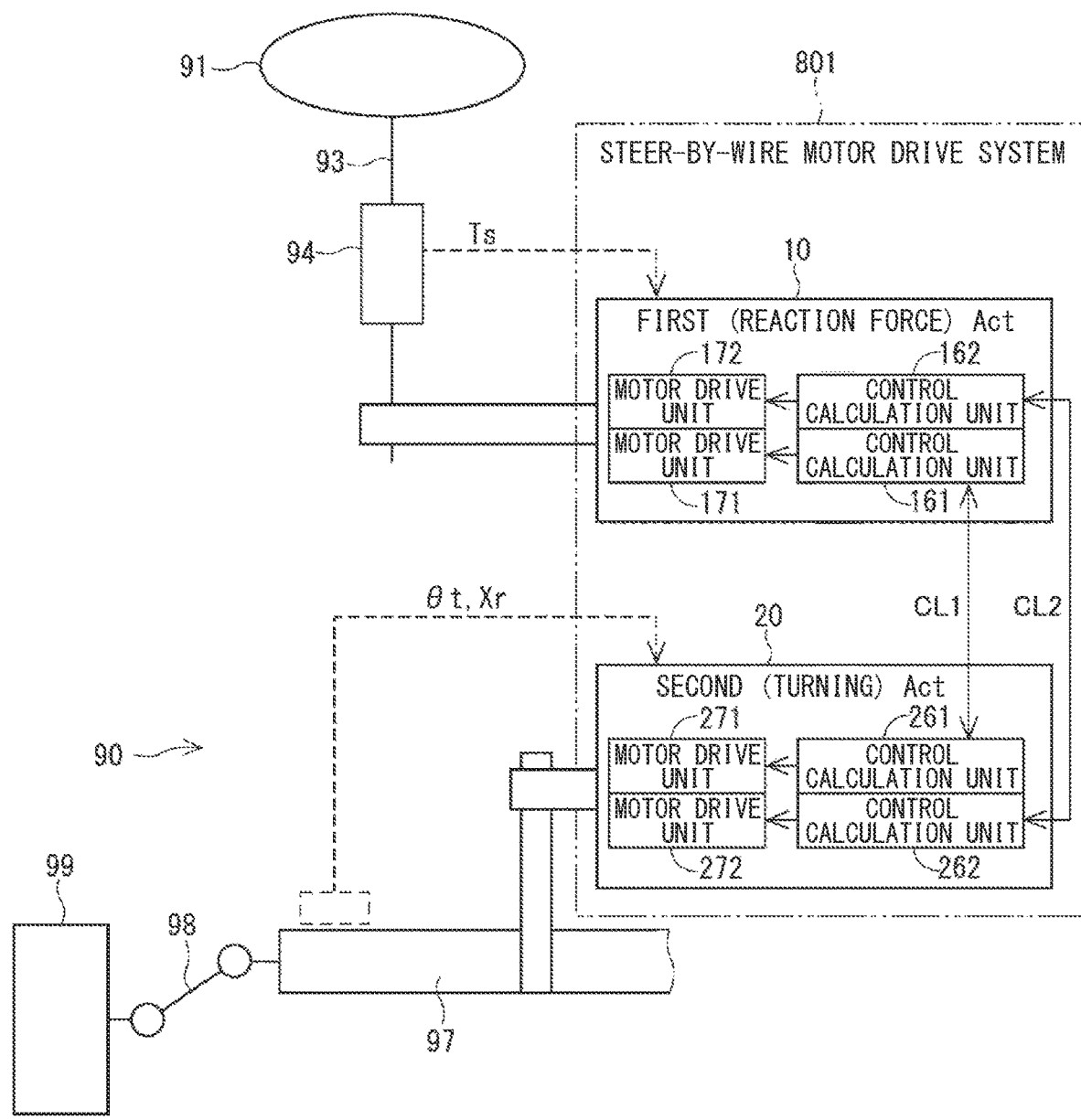
FIG. 1 is an overall configuration diagram of a motor drive system according to an embodiment applied to a steer-by-wire system.

For example, in a fail-safe control device of a control system, when one of two ECUs fails, the failed ECU is stopped, and the control is continued by the other normal ECU. In addition, when one of two motors fails, the failed motor is stopped, and the control is continued by using the other normal motor.

The device includes two reaction force ECUs-(A) and (D) each controlling the drive of a steering reaction force motor, and two turning ECUs-(B) and (C) each controlling the drive of a turning motor. For example, when one reaction force ECU-(A) fails, the reaction force ECU-(A) is stopped, and the drive controls of the steering reaction force motor and the turning motor are continued by the other normal reaction force ECU-(D) and the two turning ECUs-(B) and (C).

In the present description, what includes the "reaction force ECU" and the "steering reaction force motor" in this example is generally referred to as a "first actuator", and what includes the "rolling ECU" and the "rolling motor" is generally referred to as a "second actuator". In addition, the "reaction force ECU" and the "steering reaction force motor" in this example are referred to as a "control calculation unit in the first actuator" and a "motor drive unit in the first actuator", respectively. The "rolling ECU" and the "rolling motor" in this example are referred to as a "control calculation unit in the second actuator" and a "motor drive unit in the second actuator", respectively. The "control calculation unit" is also referred to as a "processor", and a "motor drive unit" is also referred to as a "motor driver."

That is, the "first actuator" and the "second actuator" in the present description may be actuators for any application. In addition, the term "actuator" means not only a mechanical element to be driven by a drive signal from the outside but also a drive device in which a motor drive unit outputs torque by a drive signal generated by a control calculation unit included in the drive device. Note that the control calculation unit and the motor drive unit in the actuator may be physically integrated, or may be configured separately via a signal line.

Here, in an example, a configuration is assumed in which: the reaction force ECU-(A) that is "one control calculation unit in the first actuator" and the turning ECU-(B) that is "one control calculation unit in the second actuator" form a pair so as to mutually transmit and receive information; and information are mutually transmitted and received between the reaction force ECUs-(A) and (D) and between the turning ECUs-(B) and (C) that are "control calculation units of a plurality of systems in the same actuator". In a case where any one of the control calculation units fails or communication through inter-actuator communication or inter-system communication is interrupted, there is a possibility that information to be transmitted to a normal control calculation unit may become an abnormal value. Therefore, transmission and reception of information by a normal control calculation unit is not ensured, and there is a risk that the motor drive control may not be properly continued.

Furthermore, a configuration is assumed in which failure information and control information are communicated among all the ECUs. In this configuration, an amount of information becomes excessive if the communication is performed by one bus. If a plurality of buses are provided, the number of input/output terminals increases. This tendency becomes more remarkable when there are three or more actuators or systems that work together.

The present disclosure provides a motor drive system that, when another control calculation unit fails or communication is interrupted, ensures transmission and reception of information by a normal control calculation unit.

An exemplary embodiment of the present disclosure provides a motor drive system that includes a plurality of actuators including a first actuator and a second actuator each functioning as a motor configured to output torque. Each of the first actuator and the second actuator includes a plurality of control calculation units and a plurality of motor drive units. The plurality of control calculation units are provided redundantly and each configured to perform a calculation related to a motor drive control. The plurality of motor drive units are provided redundantly and each configured to drive based on a drive signal generated by a corresponding control calculation unit and output the torque. A unit of a combination of the control calculation unit and the motor drive unit corresponding to each other in each of the first actuator and the second actuator is defined as a system. Each of the first actuator and the second actuator includes a plurality of systems. The system in the first actuator and the system in the second actuator corresponding to each other are paired. The control calculation unit in the first actuator and the control calculation unit in the second actuator paired with each other perform transmission and reception of information with each other by an inter-actuator communication. In each of the first actuator and the second actuator, the control calculation unit of each of the plurality of systems performs transmission and reception of information with each other by an inter-system communication. A state where any one of the control calculation units becomes unable to perform transmission and reception of normal information in response that (i) a failure occurs in a control calculation unit paired with the any one of the control calculation units, or in a control calculation unit of another system in the first actuator or the second actuator including the any one of the control calculation units, or (ii) the inter-actuator communication or the inter-system communication is interrupted, is defined as an in-system communication abnormal state. In the in-system communication abnormal state, a normal control calculation unit in which no failure occurs transmits, as alternative information, information that has been incapable of being transmitted by the normal control calculation unit and information that has been received from another normal control calculation unit for the inter-actuator communication, in addition to information which the control calculation unit transmits in a normal state. In the in-system communication abnormal state, when the normal control calculation unit receives the information including the alternative information, the normal control calculation unit continues the motor drive control using at least a part of the information received.

In the exemplary embodiment of the present disclosure, even in a case where information cannot be transmitted and received via an original communication path in the in-system communication abnormal state, normal control calculation units transmit and receive, as the alternative information, information notifying a failure and control information to be used for the motor drive control. As a result, transmission and reception of information is ensured. As a result, the control calculation unit that has received the information including the alternative information can properly continue the motor drive control.

Hereinafter, a plurality of embodiments of a motor drive system of the present disclosure will be described with reference to the drawings. The motor drive system of each embodiment includes a plurality of actuators each functioning as a motor that outputs torque. Each actuator includes a plurality of control calculation units provided redundantly and a plurality of motor drive units provided redundantly. A unit of a combination of the control calculation unit and the motor drive unit, corresponding to each other in each actuator, is defined as a "system".

The following first to third embodiments are variations related to a configuration of communication of "alternative information" (the meaning of which will be described later) in an "in-system communication abnormal state". In addition, fourth to sixth embodiments are variations related to the number of actuators or the number of systems in the system, and substantially the same configurations as those of the above-described embodiments will be denoted by the same reference numerals, and description thereof will be omitted. The first to sixth embodiments described above are collectively referred to as "the present embodiment".

First to Third Embodiments

FIG. 1 illustrates a motor drive system 801 applied to a steer-by-wire system 90 of a vehicle. In the steer-by-wire system 90 in which a steering mechanism and a turning mechanism of the vehicle are mechanically separated, a first actuator 10 is used as a reaction force actuator, and a second actuator 20 is used as a turning actuator. The steering mechanism of the steer-by-wire system 90 includes a steering wheel 91, a steering shaft 93, a steering torque sensor 94, a first actuator 10, and the like. The turning mechanism of the steer-by-wire system 90 includes a rack 97, a knuckle arm 98, the second actuator 20, and the like. Wheels 99 are turned by turning torque output by the second actuator 20. The wheel 99 only on one side is illustrated, and illustration of the wheel on the opposite side is omitted.

The motor drive system 801 includes the first actuator 10 and the second actuator 20. In the following drawings, "Act" means an "actuator". The first actuator 10 functions as a motor that outputs reaction torque in accordance with steering torque by a driver and a road surface reaction force. By rotating the steering wheel 91 such that the first actuator 10 applies a reaction force, an appropriate steering feeling is given to the driver. The second actuator 20 functions as a motor that outputs turning torque for turning the wheels 99. When the second actuator 20 appropriately turns the wheels 99, the vehicle is deflected to a direction intended by the driver.

Each of the actuators 10 and 20 has a two-system redundant configuration. That is, the first actuator 10 includes two control calculation units 161 and 162 provided redundantly and two motor drive units 171 and 172 provided redundantly. The second actuator 20 includes two control calculation units 261 and 262 provided redundantly and two motor drive units 271 and 272 provided redundantly.

Hereinafter, two systems in each actuator are referred to as a "first system" and a "second system". For example, there may be a master-slave relationship between the first system and the second system, so that the first system may function as a main system (or master) and the second system may function as a sub system (or slave). Alternatively, the first system and the second system may have an equal relationship. Elements of the first system are denoted by "1" at the ends of their reference numerals, and elements of the second system are denoted by "2" at the ends of their reference numerals.

Since the basic configurations of the respective actuators 10 and 20 are similar to each other, a point, that can be sufficiently described by the description of one of the two, will be representatively described with reference to components of the first actuator 10. The second actuator 20 can be interpreted by replacing the corresponding numeral. Specifically, the control calculation unit 161 or 162 is constituted by a microcomputer or an ASIC to perform calculation related to motor drive control. Note that the control calculation units 161 and 162 may also execute controls other than the motor drive control, but the other controls will not be mentioned in the present description. When the control calculation unit "stops the motor drive control", as will be described later, it does not matter whether to stop the other controls.

In more detail, the control calculation unit 161 or 162 includes a CPU, a ROM, a RAM, an I/O, bus lines connecting these components, and the like, which are not illustrated. The control calculation unit 161 or 162 executes control by software processing in which a program stored in advance in a substantive memory device (i.e., a readable non-transitory tangible recording medium), such as a ROM, is executed by a CPU, or by hardware processing using a dedicated electronic circuit.

The motor drive unit 171 or 172 is driven on the basis of a drive signal generated by the corresponding control calculation unit 161 or 162, and outputs torque. For example, in a multi-phase brushless motor, the motor drive unit 171 or 172 includes an inverter that supplies a voltage, a multi-phase winding wound around a stator, a rotor having a permanent magnet, and the like. The motor drive units 171 and 172 of the two systems output torque by working together. The motor drive units 171 and 172 may be configured, for example, as a double-winding motor in which multi-phase windings of two systems are wound around a common stator. The motor drive unit may be referred to as a motor driver.

In the drawing, an arrow from the control calculation unit 161 to the motor drive unit 171 and an arrow from the control calculation unit 162 to the motor drive unit 172 indicate drive signals in the respective systems. In the case of a multi-phase brushless motor, the drive signal is a switching pulse signal of the inverter, and is typically a PWM signal or the like. The control calculation unit 161 or 162 in the first actuator 10 acquires steering torque Ts detected by the steering torque sensor 94, a road surface reaction force, and the like, and generates the drive signals on the basis of these pieces of information. The control calculation unit 261 or 262 in the turning actuator 20 acquires a steering angle or turning angle θt, a rack stroke Xr, and the like, and generates the drive signals on the basis of these pieces of information.

In the present description, the term "actuator" is used as a single unit of drive device including a plurality of control calculation units and a plurality of motor drive units, as described above. In the actuator of the present embodiment, the control calculation unit and the motor drive unit may be physically integrated as a so-called "electromechanical integrated" motor. Alternatively, the control calculation unit and the motor drive unit may be configured separately via a signal line, as a so-called "electromechanical separate" motor.

The first system in the first actuator 10 and the first system in the second actuator 20 form a pair with each other. In addition, the second system in the first actuator 10 and the second system in the second actuator 20 form a pair with each other. The control calculation units of the systems forming a pair with each other in the first actuator and the second actuator mutually transmit and receive information through inter-actuator communications CL1 and CL2, respectively. Note that the second character "L" of the symbol of the inter-actuator communication is derived from "local communication".

The "information mutually transmitted and received" through the inter-actuator communication includes at least abnormal information in the respective actuators 10 and 20. An abnormality of the control calculation unit includes an abnormality of data, an abnormality of calculation processing, an abnormality of internal communication, an abnormality of synchronization, and the like. An abnormality of the motor drive unit includes an abnormality of a switching element and the like of the inverter, a short circuit of a relay provided in a circuit, an open failure, a disconnection failure of a motor winding, and the like. When these failures occur, the respective actuators 10 and 20 mutually transmit and receive the information.

Figure 2:
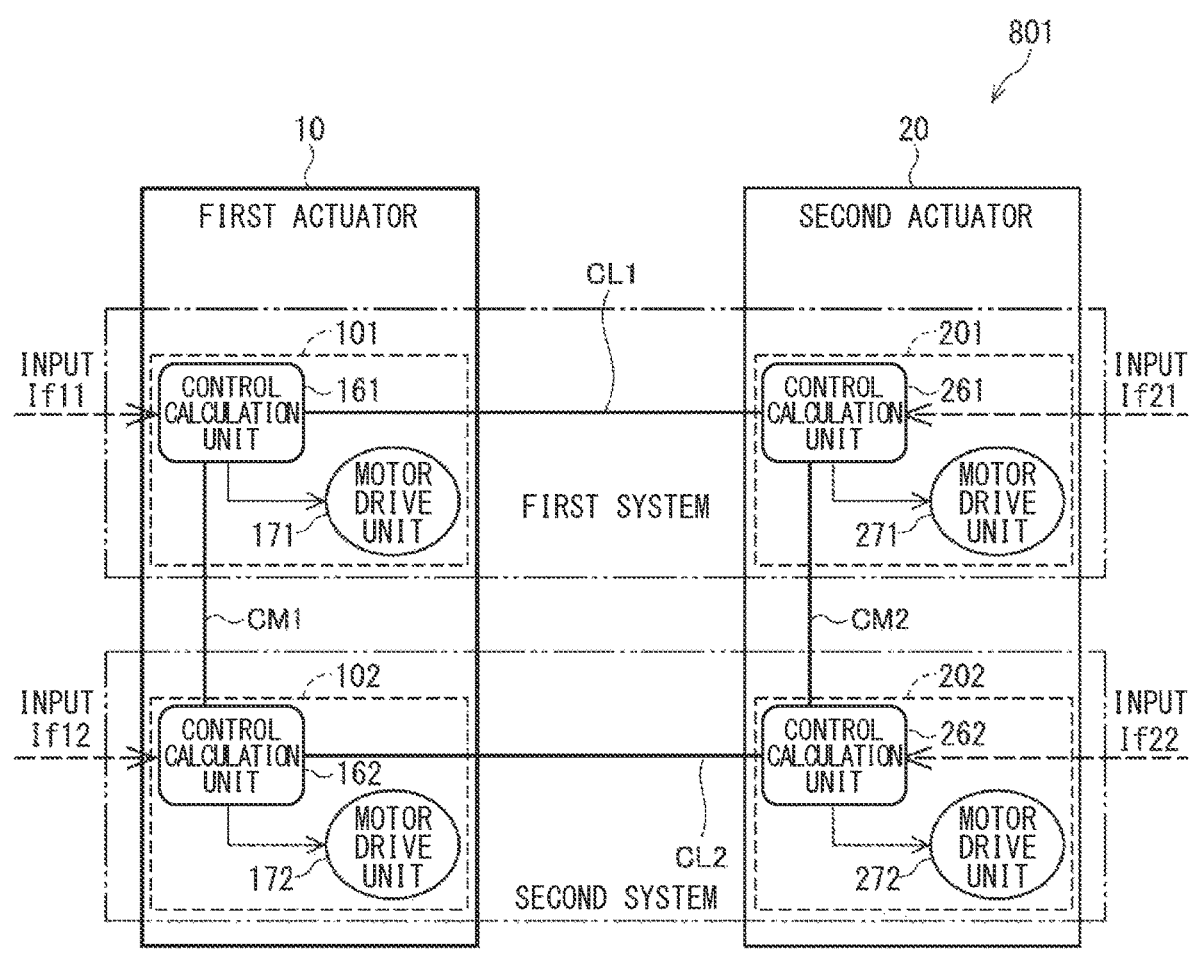
FIG. 2 is a schematic diagram of the motor drive system of FIG. 1.

FIG. 2 illustrates a schematic drawing in which the motor drive system 801 of FIG. 1 is simplified. Although a steer-by-wire system is illustrated in FIG. 1 as a specific application example, the first actuator 10 and the second actuator 20 of the present embodiment may be motors for any application. FIG. 2 generally illustrates a configuration of the "motor drive system 801 including the two actuators 10 and 20 each having a two-system redundant configuration". Each drawing of configurations according to fourth to sixth embodiments will also be drawn according to FIG. 2. In FIG. 2, the first system and the second system in each of the actuators 10 and 20 are indicated by broken line frames, and are denoted by reference numerals of "first system 101 or 201" and "second system 102 or 202". However, in the following description, reference numerals of the systems may be appropriately omitted in places obvious from the context and the like.

Although partially overlapping the description of FIG. 1, the configurations of the respective actuators 10 and 20 will be described again. In the first actuator 10, the control calculation unit 161 of the first system 101 and the control calculation unit 162 of the second system 102 are provided redundantly, and the motor drive unit 171 of the first system 101 and the motor drive unit 172 of the second system 102 are provided redundantly. In the second actuator 20, the control calculation unit 261 of the first system 201 and the control calculation unit 262 of the second system 202 are provided redundantly, and the motor drive unit 271 of the first system 201 and the motor drive unit 272 of the second system 202 are provided redundantly.

In the configuration of FIG. 2, information, such as a signal of the steering torque Ts or a feedback signal of the steering angle or turning angle θt or of the rack stroke Xr, is redundantly input to the control calculation unit of each system in each of the actuators 10 and 20. That is, an information signal generated exclusively for the first system is input to the first system, and an information signal generated exclusively for the second system is input to the second system, instead of one information signal being branched and input to the control calculation units of the respective systems.

In the case of the first actuator 10, for example, information If11 and information If12 are redundantly input to the control calculation unit 161 of the first system 101 and the control calculation unit 162 of the second system 102, respectively. In the case of the second actuator 20, information If21 and information If22 are redundantly input to the control calculation unit 261 of the first system 201 and the control calculation unit 262 of the second system 202, respectively. As a result, if an input unit of the control calculation unit of one system fails, the control calculation unit of the other system can acquire correct information.

In addition, the control calculation unit 161 of the first system 101 and the control calculation unit 162 of the second system 102 in the same first actuator mutually transmit and receive information through inter-system communication CM1. The control calculation unit 261 of the first system 201 and the control calculation unit 262 of the second system 202 in the same second actuator 20 mutually transmit and receive information through inter-system communication CM2. Note that the second character "M" of the symbol of the inter-system communication is derived from "inter-microcomputer communication". The information mutually transmitted through the inter-system communications CM1 and CM2 include, for example, an input value from the outside, a current command value calculated by the control calculation unit, a current limit value, and an actual current to be fed back. In addition, abnormal signals of the respective systems are mutually transmitted and received.

As described above, the first system 101 of the first actuator 10 and the first system 201 of the second actuator 20 form a pair with each other, and the second system 102 of the first actuator 10 and the second system 202 of the second actuator 20 form a pair with each other. That is, the systems denoted by the same number form a pair with each other. However, the terms of the "first system" and the "second system" are merely assigned for convenience, and it is up to you to choose which of the two systems as the "first system" and which thereof as the "second system". In some systems, the "first system in the first actuator" and the "second system in the second actuator" may form a pair, and the "second system in the first actuator" and the "first system in the second actuator" may form a pair.

The control calculation units of the systems forming a pair with each other in the first actuator 10 and the second actuator 20 mutually transmit and receive information through the inter-actuator communication. Therefore, the control calculation units 161 and 261 of the first systems in the respective actuators 10 and 20 mutually transmit and receive information through the inter-actuator communication CL1. The control calculation units 162 and 262 of the second systems in the respective actuators 10 and 20 mutually transmit and receive information through the inter-actuator communication CL2.

Next, an operation of the motor drive system 801, when a failure occurs in the first system in the first actuator 10 in the motor drive system 801 of FIG. 2, will be described with reference to FIG. 3. At this time, there is a possibility that control information, that is to be originally transmitted, when it is in a normal state, from the control calculation unit 161 of the first system in the first actuator 10 to the control calculation unit 261 of the second system in the second actuator 20, may become an abnormal value. Therefore, there is a risk that, for example, the control calculation unit 261 of the second system may not be able to properly continue the motor drive control.

Hereinafter, a state, in which any one of the control calculation units becomes unable to transmit and receive normal information because the control calculation unit, forming a pair with the any one of the control calculation units, in the other actuator or of another system in the same actuator fails, or because communication through the inter-actuator communication or the inter-system communication is interrupted, is defined as an "in-system communication abnormal state".

In the present embodiment, each of the control calculation units that is normal transmits, in addition to information that each of the control calculation units is to transmit in a normal state, information that each of the control calculation units has not been able to transmit, and information for the inter-actuator communication received from another control calculation unit, collectively as the "alternative information", in the in-system communication abnormal state. The control calculation unit that has received information including the alternative information continues the motor drive control by using at least a part of the received information.

Figure 3:
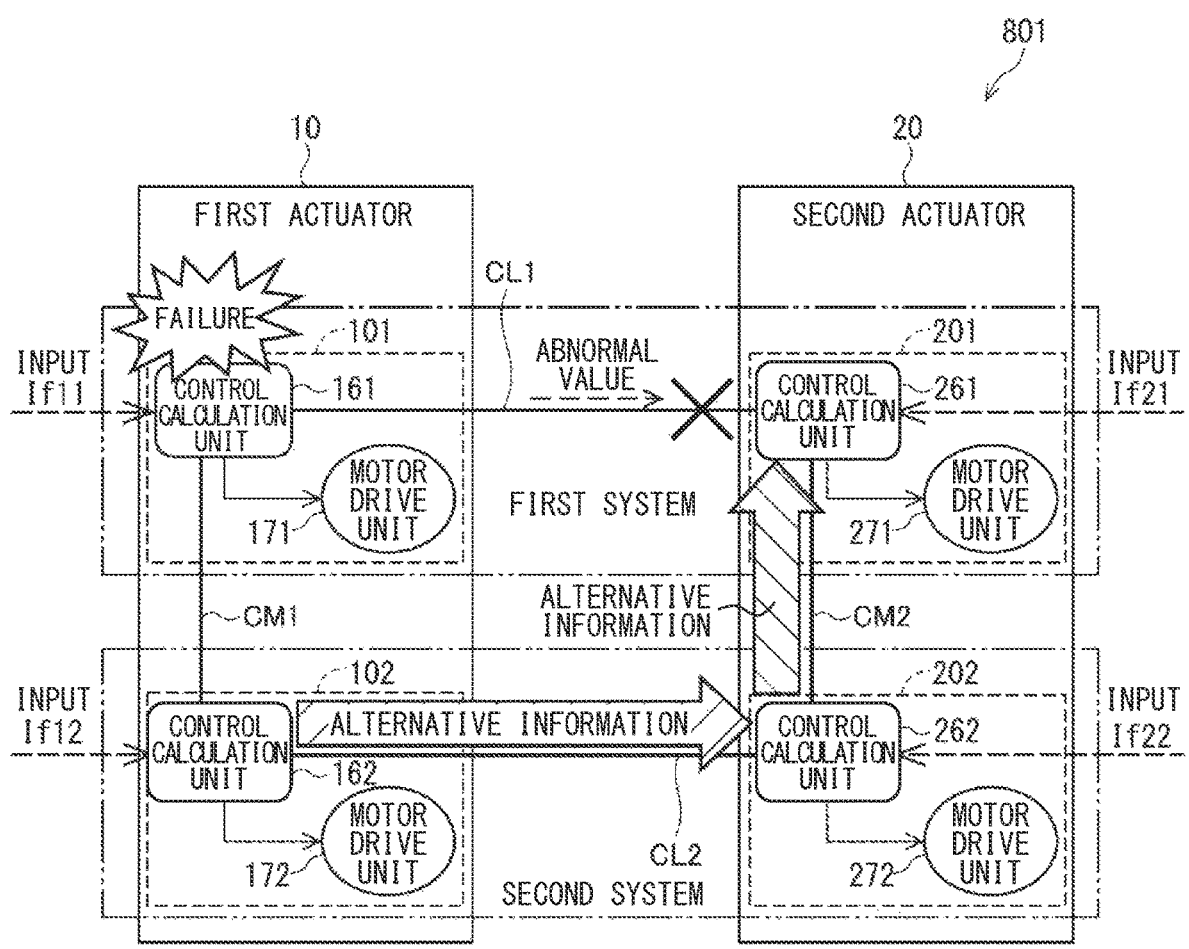
FIG. 3 is a diagram illustrating transmission of alternative information when a failure occurs.

In the example of FIG. 3, the alternative information is transmitted from the control calculation unit 162 of the second system in the first actuator 10 to the control calculation unit 262 of the second system in the second actuator 20 through the inter-actuator communication CL2. Furthermore, the alternative information is transmitted from the control calculation unit 262 of the second system in the second actuator 20 to the control calculation unit 261 of the first system in the second actuator 20 through the inter-system communication CM2. The control calculation unit 261 of the first system in the second actuator 20 that has received the information including the alternative information can continue the motor drive control by using at least a part of the received information.

Subsequently, variations of the configuration of communication of the alternative information in the in-system communication abnormal state will be described as first to third embodiments with reference to FIGS. 4 to 9. Here, for convenience of description, the four control calculation units 161, 162, 261, and 262 are indicated by the following symbols.

The "control calculation unit 161 of the first system in the first actuator 10" is indicated by a "control calculation unit A1"

The "control calculation unit 162 of the second system in the first actuator 10" is indicated by a "control calculation unit A2"

The "control calculation unit 261 of the first system in the second actuator 20" is indicated by a "control calculation unit B1"

The "control calculation unit 262 of the second system in the second actuator 20" is indicated by a "control calculation unit B2"

That is, the first actuator 10 is denoted by "A", the second actuator 20 is denoted by "B", the first system is denoted by "1", and the second system is denoted by "2", and the characters are arranged in the order of the actuator and the system. In the following description, symbols, such as "A1"

and "A2", may be used alone with the description of the "control calculation unit" omitted.

In addition, an initial letter of information to be communicated through the inter-system communications between the control calculation units A1 and A2 and between the control calculation units B1 and B2 in a normal state is denoted by "M", and an initial letter of information to be communicated through the inter-actuator communications between the control calculation units A1 and B1 and between the control calculation units A2 and B2 in a normal state is denoted by "L". For example, "MA1" is information related to the control calculation unit A1 that is communicated through the inter-system communication in a normal state, and "LA1" is information related to the control calculation unit A1 that is communicated through the inter-actuator communication in a normal state. In FIGS. 4 to 9, illustration of the inter-actuator communications CL1 and CL2, the inter-system communications CM1 and CM2, and the input information If11, If12, If21, and If22 to be input to the respective control calculation units, which are illustrated in FIGS. 2 and 3, is omitted.

Figure 4:
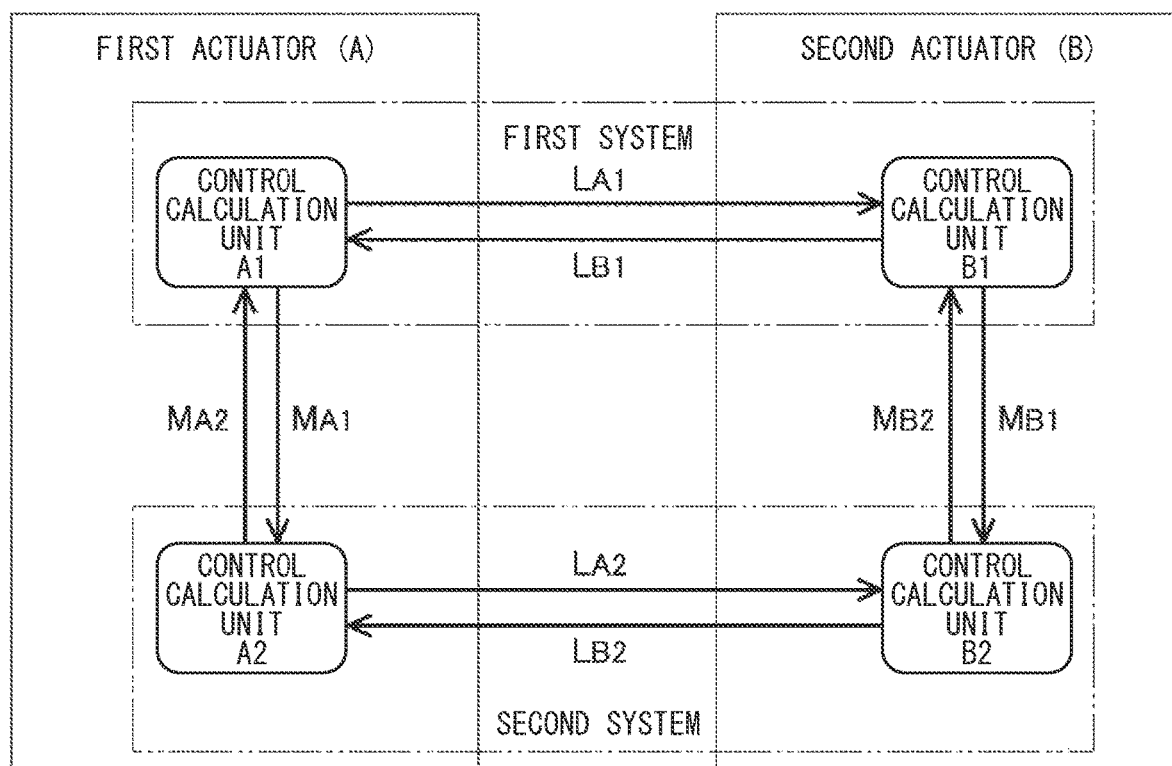
FIG. 4 is a configuration diagram of communication in a normal state according to each embodiment.

In a normal state in each embodiment, through the inter-system communications between the control calculation units A1 and A2 and between the control calculation units B1 and B2 and the inter-actuator communications between the control calculation units A1 and B1 and between the control calculation units A2 and B2, any of their own information is bidirectionally transmitted and received, as illustrated in FIG. 4. For example, between the control calculation units A1 and B1, the control calculation unit A1's own information LA1 is transmitted from the control calculation unit A1 to the control calculation unit B1, and the control calculation unit B1's own information LB1 is transmitted from the control calculation unit B1 to the control calculation unit A1. In this way, each of the control calculation units A1, A2, B1, and B2 performs the motor drive control by using, in addition to the input information If11, If12, If21, and If22 from the input unit, the information received through the inter-system communications and the inter-actuator communications.

Figure 5:
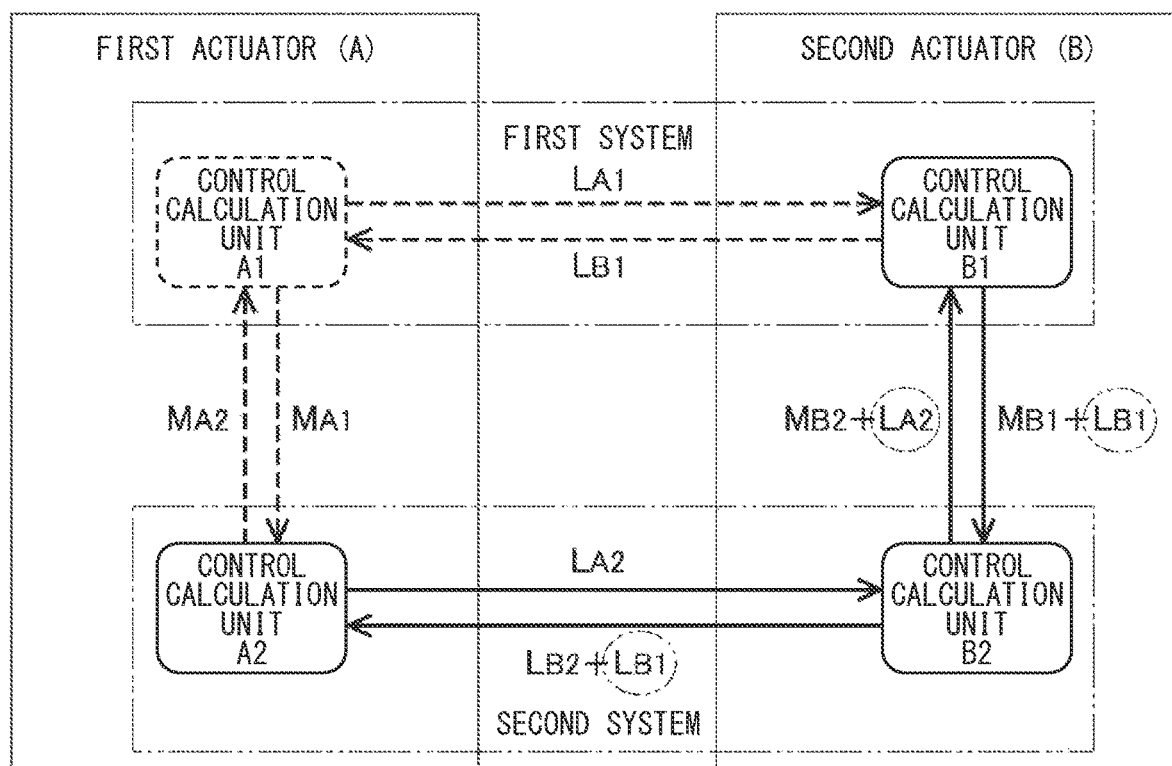
FIG. 5 is a configuration diagram of communication of alternative information when a control calculation unit A1 fails, according to first and second embodiments.
Figure 6:
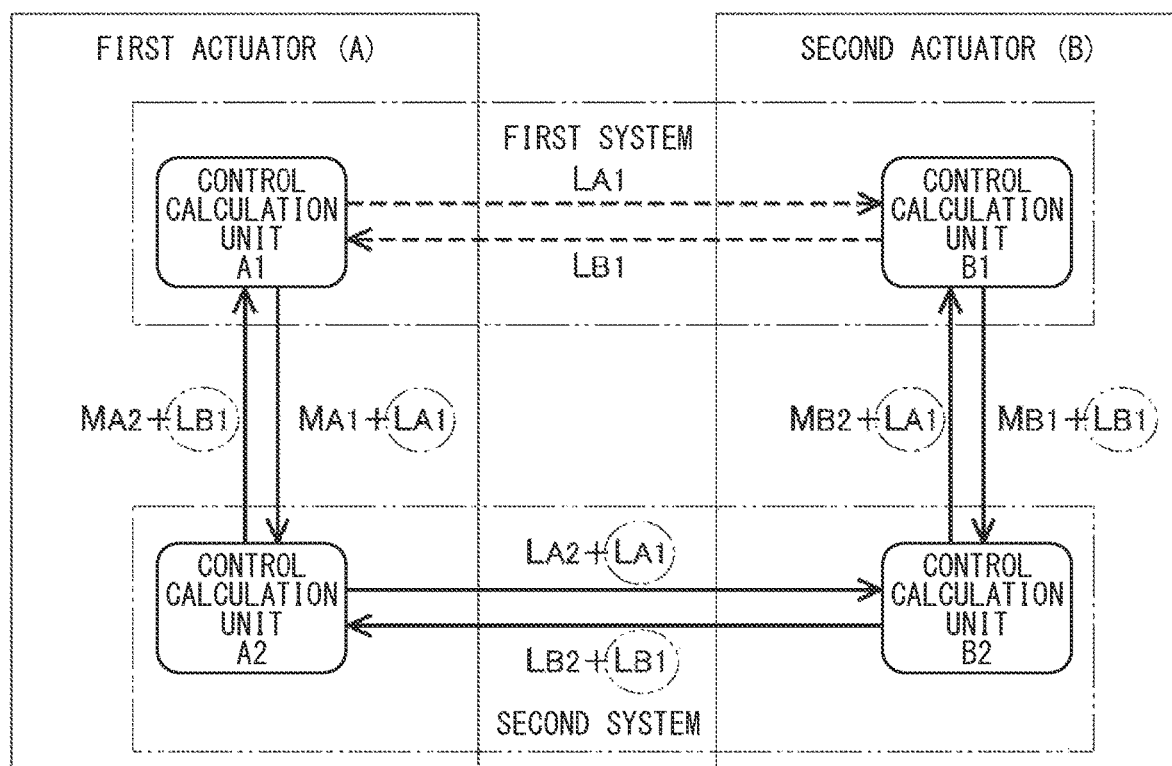
FIG. 6 is a configuration diagram of communication of alternative information when communication between A1 and B1 is interrupted, according to the first embodiment.
Figure 7:
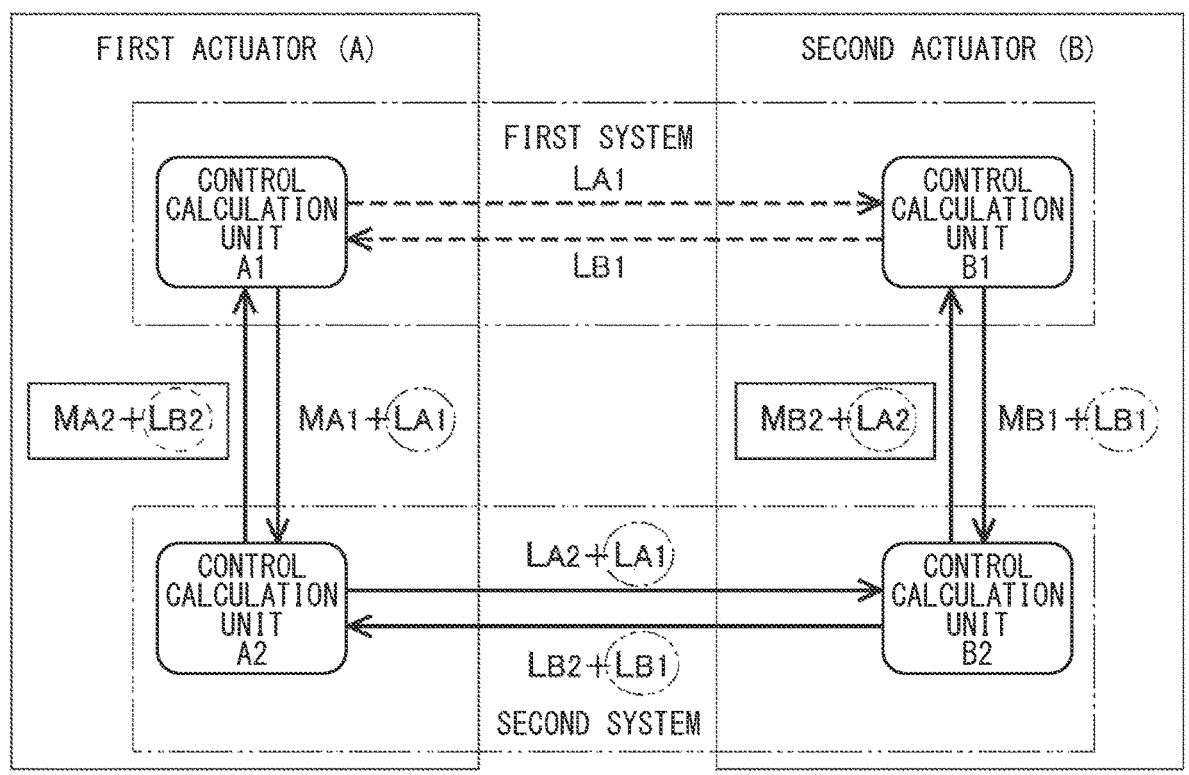
FIG. 7 is a configuration diagram of communication of alternative information when communication between A1 and B1 is interrupted, according to the second embodiment.
Figure 8:
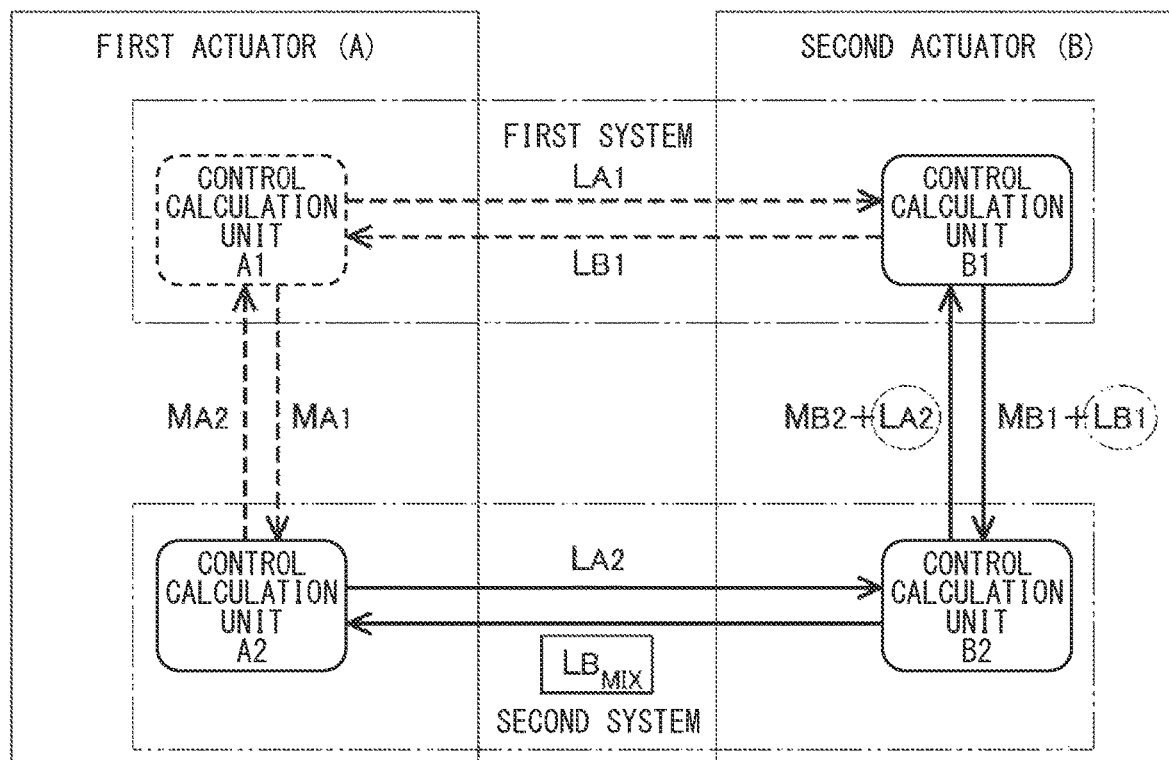
FIG. 8 is a configuration diagram of communication of alternative information when a control calculation unit A1 fails, according to a third embodiment.
Figure 9:
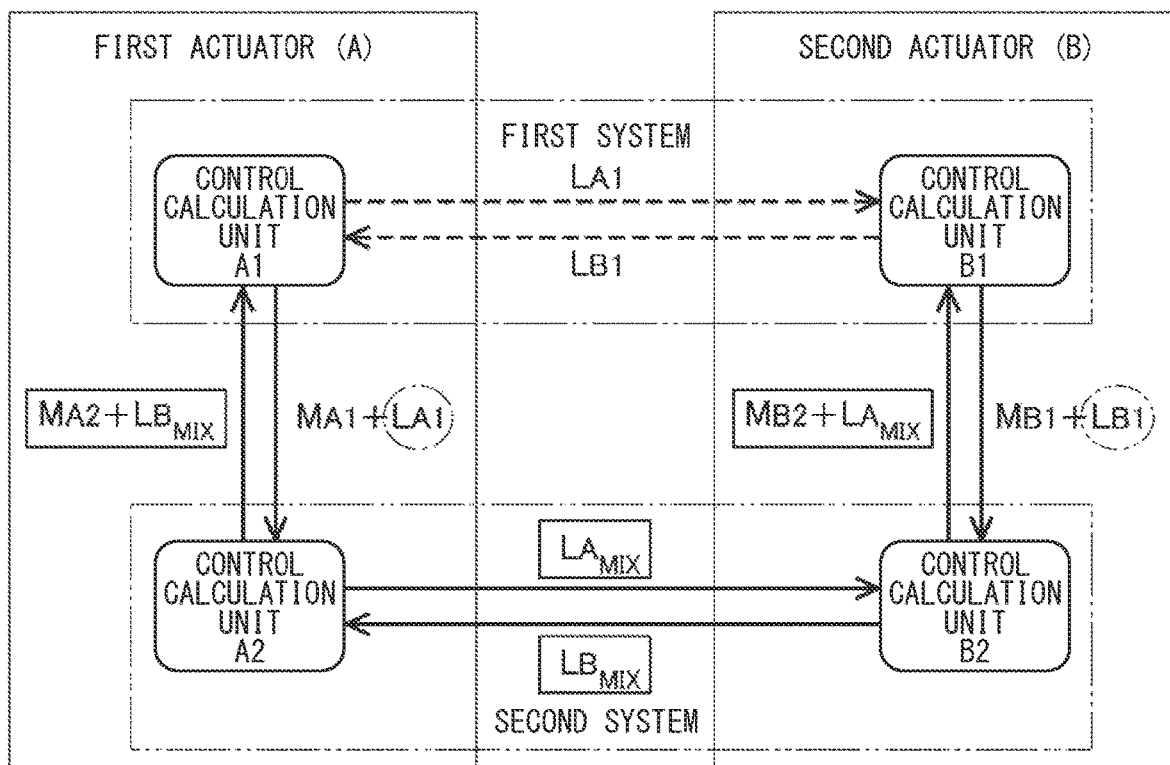
FIG. 9 is a configuration diagram of communication of alternative information when communication between A1 and B1 is interrupted, according to the third embodiment.

Next, configurations of communication of the alternative information according to the first to third embodiments, when <X> any one of the control calculation units fails and <Y> communication through the inter-actuator communication is interrupted, those being taken as the types of the in-system communication abnormal state, will be sequentially described. Configurations of communication of the alternative information, when the control calculation unit A1 fails, which is a specific example of the type <X>, and when the communication through the inter-actuator communication between the control calculation units A1 and B1 is interrupted, which is a specific example of the type <Y>, are illustrated. In FIGS. 5 and 8, the failed control calculation unit A1 is indicated by a broken line frame, and the communications that the control calculation unit A1 is involved in are indicated by broken line arrows. In FIGS. 6, 7, and 9, the interrupted communications are indicated by broken line arrows.

In FIGS. 5 to 9 and the corresponding description, when its own information and the alternative information are collectively transmitted, the case is indicated in the form of "its own information+alternative information". In addition, the alternative information in the drawings are surrounded by a one-dot chain line ellipse, a two-dot chain line ellipse, or a broken line ellipse. Among the alternative information, the information for the inter-actuator communication (LA1 or the like) is transmitted through both the inter-actuator communication and the inter-system communication. On the other hand, the information for the inter-system communication (MA1 or the like) is transmitted only through the inter-system communication. Furthermore, it is also necessary to communicate, in addition to the alternative information, "information notifying a failure".

First Embodiment

In the communication configuration of the first embodiment, the original information is used as much as possible. In the event of the type <X> illustrated in FIG. 5 in which A1 fails, "MB2+LA2", combined with alternative information LA2 that is "information for the inter-actuator communication that the control calculation unit B2 has received from another control calculation unit A2", is transmitted from the control calculation unit B2 to the control calculation unit B1. In addition, "MB1+LB1", combined with alternative information LB1 that is "information that the control calculation unit B1 has failed to transmit", is transmitted from the control calculation unit B1 to the control calculation unit B2. Next, "LB2+LB1", combined with alternative information LB1 that is "information for the inter-actuator communication that the control calculation unit B2 has received from another control calculation unit B1", is transmitted from the control calculation unit B2 to the control calculation unit A2.

In the event of the type <Y> illustrated in FIG. 6 in which communication between the control calculation units A1 and B1 is interrupted, "MA1+LA1", combined with alternative information LA1 that is "information that the control calculation unit A1 has failed to transmit", is transmitted from the control calculation unit A1 to the control calculation unit A2. Next, "LA2+LA1", combined with alternative information LA1 that is "information for inter-actuator communication that the control calculation unit A2 has received from another control calculation unit A1", is transmitted from the control calculation unit A2 to the control calculation unit B2. Next, "MB2+LA1", combined with alternative information LA1 that is "information for the inter-actuator communication that the control calculation unit B2 has received from another control calculation unit A2, is transmitted from the control calculation unit B2 to the control calculation unit B1.

In addition, the alternative information LB1 is transmitted from the control calculation unit B1 to the control calculation unit B2 and from the control calculation unit B2 to the control calculation unit A2, similarly to FIG. 5. Further, "MA2+LB1", combined with the alternative information LB1 that is "information for the inter-actuator communication that the control calculation unit A2 has received from another control calculation unit B2, is transmitted from the control calculation unit A2 to the control calculation unit A1.

In the present embodiment, even in a case where information cannot be transmitted and received via the original communication path in the in-system communication abnormal state, normal control calculation units transmit and receive, as the alternative information, information notifying a failure and control information to be used for the motor drive control, as described above. As a result, transmission and reception of information is ensured. As a result, the control calculation unit that has received the information including the alternative information can properly continue the motor drive control. In particular, as an advantage of the first embodiment, the information LA1 and LB1 to be originally used are transmitted as the alternative information without omission when communication is interrupted, so that control similar to that in a normal state can be performed.

Second Embodiment

In a second embodiment, the information to be communicated as the alternative information is limited to "information of an adjacent control calculation unit that is directly communicated with". That is, in the in-system communication abnormal state, each of the control calculation units that is normal transmits, of the information that each of the control calculation units has received, only the information received from a control calculation unit that each of the control calculation units directly communicates with, to another control calculation unit as the alternative information.

Since a communication configuration in the second embodiment in which the control calculation unit A1 fails is illustrated in FIG. 5 similarly to the first embodiment, description thereof will be omitted. In the communication configuration illustrated in FIG. 7 in which the communication between the control calculation units A1 and B1 is interrupted, differences from FIG. 6 are indicated by square frames. The transmissions of the alternative information LA1 from the control calculation unit A1 to the control calculation unit A2 and from the control calculation unit A2 to the control calculation unit B2 are similar to those of FIG. 6. However, "MB2+LA2" is transmitted from the control calculation unit B2 to the control calculation unit B1 by using, instead of LA1, only the "information LA2 that B2 has received from the control calculation unit A2 that the control calculation unit B2 directly communicates with" as the alternative information.

In addition, the transmissions of the alternative information LB1 from the control calculation unit B1 to the control calculation unit B2 and from the control calculation unit B2 to the control calculation unit A2 are similar to those of FIG. 6. However, "MB2+LA2" is transmitted from the control calculation unit A2 to the control calculation unit A1 by using, instead of LB1, only the "information LB2 that the control calculation unit A2 has received from the control calculation unit B2 that the control calculation unit A2 directly communicates with" as the alternative information.

In the second embodiment, the alternative information is transmitted over only up to two communications, so that the delay is smaller. As a result, the motor drive control can be properly continued by the communication configuration with a reduced amount of information. In addition, the transmission and reception information from the control calculation unit B2 to the control calculation unit B1 match each other between when the control calculation unit A1 fails and when the communication between the control calculation units A1 and B1 is interrupted, leading to good uniformity of control.

Third Embodiment

Next, in the third embodiment, in the in-system communication abnormal state, each of the control calculation units that is normal transmits information, obtained by multiplying the information for the inter-actuator communication in each of a plurality of the systems by a predetermined ratio corresponding to each of the systems, and then adding the plurality of pieces of the multiplied information, to another control calculation unit as the alternative information. "Integrated alternative information $LA_{MIX}$ and $LB_{MIX}$" illustrated in FIGS. 8 and 9 are expressed by the following formulas (1a) and (1b) using coefficients α and β (0≤α≤1, 0≤β≤1). The values of α and β are set on the basis of degrees of contribution of the first system and the second system in the motor drive control.

For example, when α=β=0.5, an average value of the information of the two systems is the integrated information.

$$LA_{MIX}=LA2\times\alpha+LA1\times(1-\alpha) \quad (1a)$$

$$LB_{MIX}=LB2\times\beta+LB1\times(1-\beta) \quad (1b)$$

In the communication configuration illustrated in FIG. 8 in which the control calculation unit A1 fails, a difference from FIG. 5 is indicated by a square frame. The transmission of the alternative information LA2 from the control calculation unit B2 to the control calculation unit B1 and the transmission of the alternative information LB1 from the control calculation unit B1 to the control calculation unit B2 are similar to those of FIG. 5. From the control calculation unit B2 to the control calculation unit A2, however, integrated information $LB_{MIX}$ of LB2 and LB1, instead of "the control calculation unit B2's own information LB2+alternative information LB1", is transmitted as the alternative information.

In the communication configuration of the type <Y> illustrated in FIG. 9 in which the communication between the control calculation units A1 and B1 is interrupted, differences from FIGS. 7 and 8 are indicated by square frames. The transmission of the alternative information LA1 from the control calculation unit A1 to the control calculation unit A2 is similar to those of FIGS. 7 and 8. From the control calculation unit A2 to the control calculation unit B2, however, integrated information $LA_{MIX}$ of LA2 and LA1, instead of "the control calculation unit A2's own information LA2+alternative information LA1", is transmitted as the alternative information. Next, from the control calculation unit B2 to the control calculation unit B1, "MB2+$LA_{MIX}$", combined with the alternative information $LA_{MIX}$ that is the "information for the inter-actuator communication that the control calculation unit B2 has received from another control calculation unit A2, is transmitted.

In addition, the transmission of the alternative information LB1 from the control calculation unit B1 to the control calculation unit B2 is similar to those of FIGS. 7 and 8. From the control calculation unit B2 to the control calculation unit A2, however, the integrated information $LB_{MIX}$ of LB2 and LB1, instead of "the control calculation unit B2's own information LB2+alternative information LB1", is transmitted as the alternative information. Next, from the control calculation unit A2 to the control calculation unit A1, "MA2+LB1", combined with the alternative information $LB_{MIX}$ that is the "information for the inter-actuator communication that the control calculation unit A2 has received from another control calculation unit B2, is transmitted.

In the third embodiment, in addition to the effects similar to those of the second embodiment, a transmission and reception amount of the inter-actuator communication can be reduced to be equal to a transmission and reception amount of only the "its own information" in a normal state. Therefore, in the in-system communication abnormal state, the motor drive control can be properly continued by a communication configuration with a further reduced amount of information.

Fourth to Sixth Embodiments

Next, motor drive systems of fourth to sixth embodiments having different numbers of actuators or systems from those of the first to third embodiments will be described with reference to schematic drawings similar to FIG. 2. The fourth to sixth embodiments conform to the first to third embodiments in that information are redundantly input to respective control calculation units, and illustration thereof in each drawing will be omitted. In addition, in a case where there are a large number of corresponding reference numerals, and the like, description of the reference numerals will be appropriately omitted.

Fourth Embodiment

Figure 10:
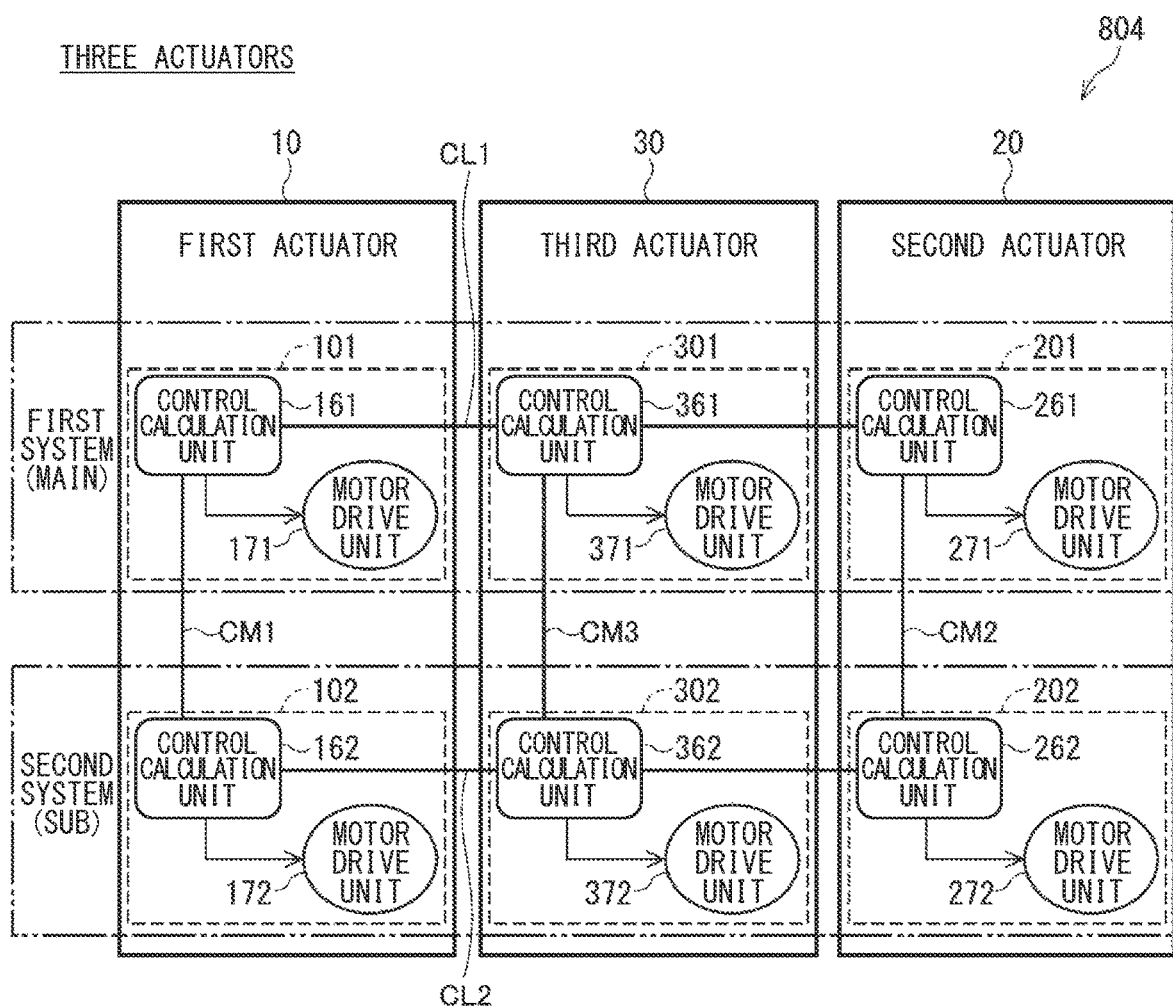
FIG. 10 is a schematic diagram of a motor drive system according to a fourth embodiment.

A motor drive system 804 of the fourth embodiment illustrated in FIG. 10 includes three actuators 10, 20, and 30 each having a two-system redundant configuration. That is, the motor drive system 804 includes, in addition to the first and second actuators 10 and 20, a third actuator 30 as an "additional actuator". The motor drive system 804 is applied to, for example, a steer-by-wire system including two turning actuators for independently turning left and right turning wheels and one reaction force actuator.

In the third actuator 30, a control calculation unit 361 of a first system 301 and a control calculation unit 362 of a second system 302 are provided redundantly, similarly to the first actuator 10 and the second actuator 20. In addition, a motor drive unit 371 of the first system 301 and a motor drive unit 372 of the second system 302 are provided redundantly. The control calculation unit 361 of the first system 301 and the control calculation unit 362 of the second system 302 mutually transmit and receive information through inter-system communication CM3 in the third actuator 30.

The control calculation unit 361 of the first system 301 in the third actuator 30 mutually transmits and receives information with the control calculation units 161 and 261 of the first systems in the first actuator 10 and the second actuator 20 through the inter-actuator communication CL1 of the first system. The control calculation unit 362 of the second system 302 in the third actuator 30 mutually transmits and receives information with the control calculation units 162 and 262 of the second systems in the first actuator 10 and the second actuator 20 through the inter-actuator communication CL2 of the second system.

A state, in which any one of the control calculation units becomes unable to transmit and receive normal information because a failure occurs in any one of the systems in any one of the three actuators 10, 20, and 30, or because communication through the inter-actuator communication or inter-system communication of any one of the systems is interrupted, is assumed. When the "other actuator" in the definition of the "in-system communication abnormal state" in the two-system configuration is interpreted as "any one of the actuators other than its own actuator", this state corresponds to the "in-system communication abnormal state". In the in-system communication abnormal state, each of the control calculation units that is normal in each of the actuators 10, 20, and 30 transmits the alternative information. The control calculation unit that has received information including the alternative information continues the motor drive control by using at least a part of the received information. Note that the configuration of communication of the alternative information may conform to any of the first to third embodiments, and the same effects as those described above can be obtained, respectively.

Fifth Embodiment

A motor drive system 805 of the fifth embodiment illustrated in FIG. 11 includes four actuators 10, 20, 30, and 40. That is, the motor drive system 805 includes the third actuator 30 and the fourth actuator 40 as "additional actuators". The motor drive system 805 is applied to, for example, a turning system including four turning actuators for independently turning left and right front and rear turning wheels.

The configurations of the first and second actuators 10 and 20 conform to those of the first embodiment. Similarly, in the third actuator 30, the control calculation unit 361 of the first system 301 and the control calculation unit 362 of the second system 302, and the motor drive unit 371 of the first system 301 and the motor drive unit 372 of the second system 302 are provided redundantly, respectively. In the fourth actuator 40, a control calculation unit 461 of a first system 401 and a control calculation unit 462 of a second system 402, and a motor drive unit 471 of the first system 401 and a motor drive unit 472 of the second system 402 are provided redundantly, respectively.

The control calculation unit 361 of the first system 301 and the control calculation unit 362 of the second system 302 mutually transmit and receive information through inter-system communication CM3 in the third actuator 30. The control calculation unit 461 of the first system 401 and the control calculation unit 462 of the second system 402 mutually transmit and receive information through inter-system communication CM4 in the fourth actuator 40.

The control calculation units 161, 261, 361, and 461 of the first system in each of the actuators 10, 20, 30, and 40 mutually transmit and receive information through the inter-actuator communication CL1 of the first system. The control calculation units 162, 262, 362, and 462 of the second system in each of the actuators 10, 20, 30, and 40 mutually transmit and receive information through the inter-actuator communication CL2 of the second system.

A state, in which any one of the control calculation units becomes unable to transmit and receive normal information because a failure occurs in any one of the systems in any one of the four actuators 10, 20, 30, and 40, or because communication through the inter-actuator communication of any one of the systems or through the inter-system communication is interrupted, is assumed. In this in-system communication abnormal state, each of the control calculation units that is normal in each of the actuators 10, 20, 30, and 40 transmits the alternative information.

Here, a connection form (topology) of the inter-actuator communication will be described with reference to FIGS. 12A to 12D. FIGS. 12A to 12D illustrate a motor drive system including the four actuators 10, 20, 30, and 40. In FIGS. 12A to 12D, the block of each of the actuators 10, 20, 30, and 40 represents control calculation units of the same system.

Figure 12A:
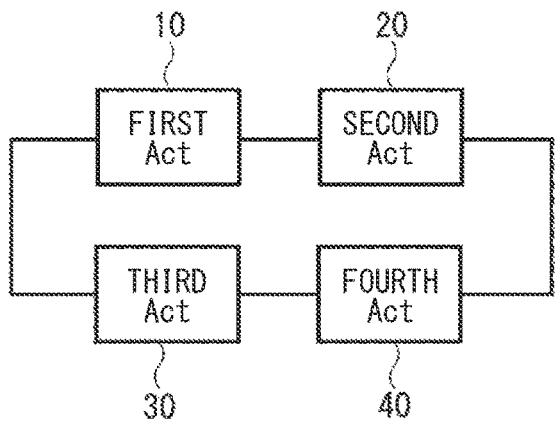
FIG. 12A is a diagram for explaining a connection form of communication among four actuators.
Figure 12B:
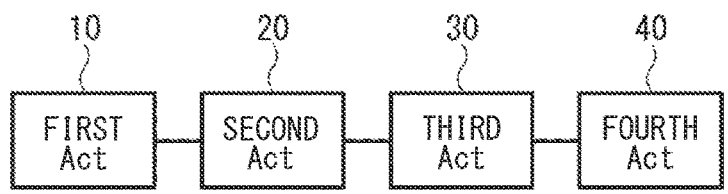
FIG. 12B is a diagram for explaining a connection form of communication among four actuators.

FIG. 12A illustrates a simplified connection form in the motor drive system 805 of FIG. 11. The control calculation units of the four actuators 10, 20, 30, and 40 are connected in a ring shape. In this example, the control calculation units in the first actuator 10 and the control calculation units in the fourth actuator 40, and the control calculation units in the second actuator 20 and the control calculation units in the third actuator 30 can communicate with each other via the control calculation units in another actuator. FIG. 12B illustrates a series type connection form. The control calculation units in each of the actuators 10, 20, 30, and 40 can communicate with the control calculation units in all actuators via the control calculation units in at least another actuator.

Figure 12C:
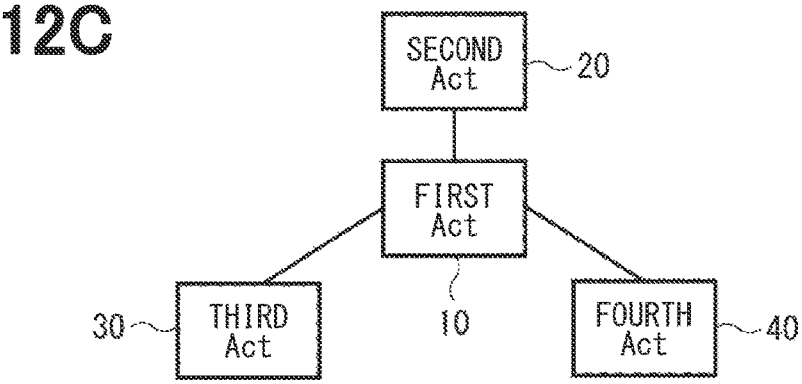
FIG. 12C is a diagram for explaining a connection form of communication among four actuators.
Figure 12D:
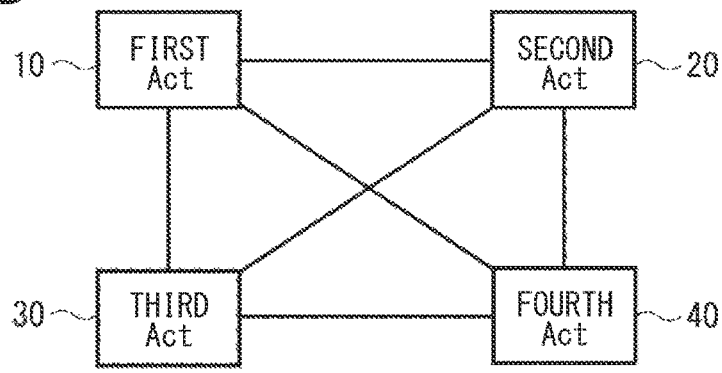
FIG. 12D is a diagram for explaining a connection form of communication among four actuators.

FIG. 12C illustrates a star type connection form. The control calculation units in the first actuator 10, located at the center in this example, directly communicate with the control calculation units in all the other actuators. The control calculation units in the other actuators can communicates with each other via the control calculation units in the first actuator 10. FIG. 12D illustrates a mesh type connection form. The control calculation units in each of the actuators 10, 20, 30, and 40 directly communicate with the control calculation units in all the other actuators.

Advantages and disadvantages of each connection form are well-known techniques in the field of communication technology, and thus description thereof will be omitted. When there are three actuators, the ring type and the mesh type are confused, and the series type and the star type are confused. As described above, the connection form of the inter-actuator communication among three or more actuators can be appropriately set according to the above basic forms or combinations thereof.

Sixth Embodiment

Figure 13:
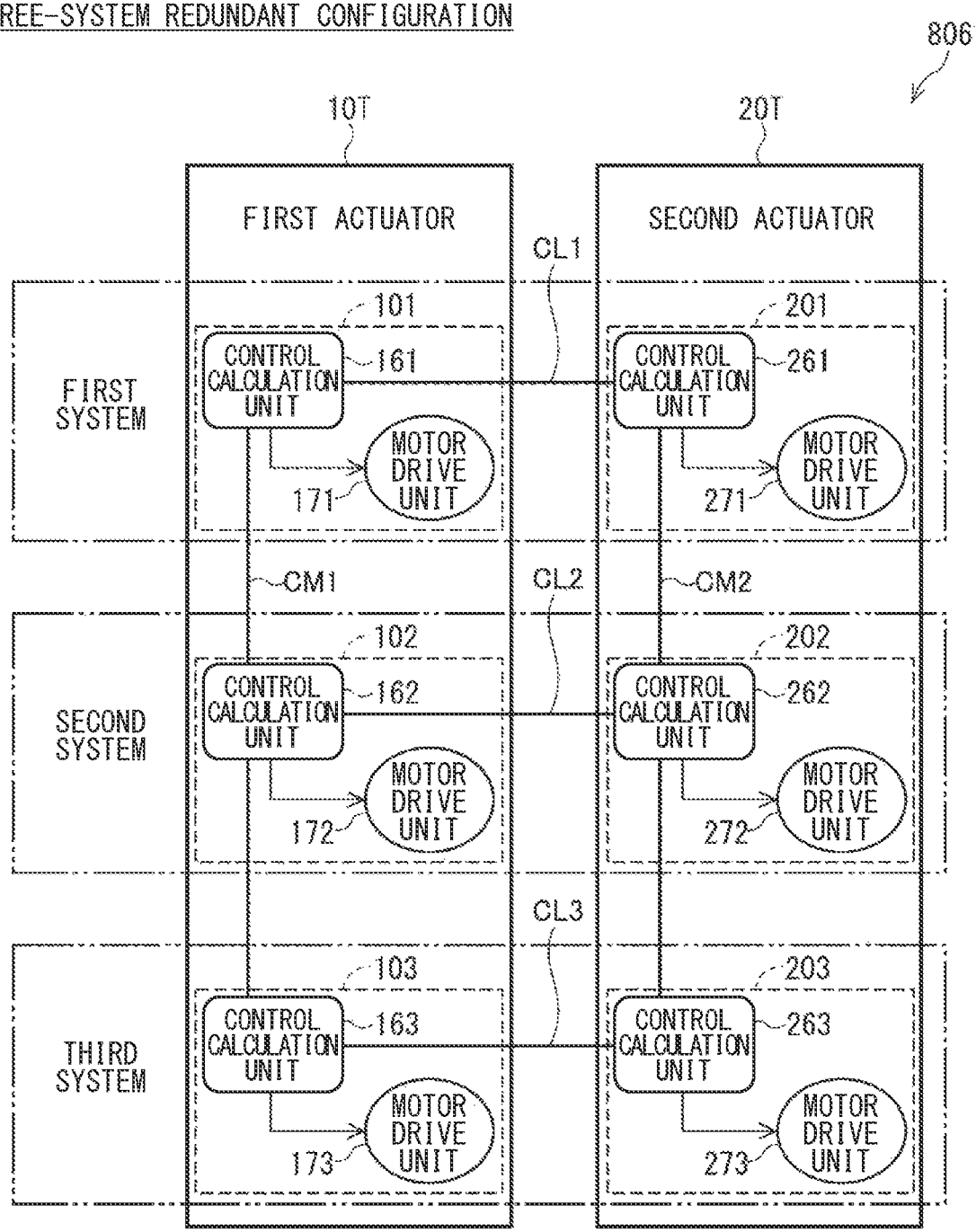
FIG. 13 is a schematic diagram of a motor drive system according to a sixth embodiment.

A motor drive system 806 of the sixth embodiment illustrated in FIG. 13 includes two actuators 10T and 20T each having a three-system redundant configuration. In the first actuator 10T, in addition to a two-system configuration similar to that of the first embodiment, a control calculation unit 163 and a motor drive unit 173 of a third system 103 are further provided redundantly. In the second actuator 20T, in addition to a two-system configuration similar to that of the first embodiment, a control calculation unit 263 and a motor drive unit 273 of a third system 203 are further provided redundantly.

The control calculation units 161, 162, and 163 of the three systems mutually transmit and receive information through the inter-system communication CM1 in the first actuator 10T. The control calculation units 261, 262, and 263 of the three systems mutually transmit and receive information through the inter-system communication CM2 in the second actuator 20T. The control calculation units 163 and 263 of the third systems in the first and second actuators 10T and 20T mutually transmit and receive information through inter-actuator communication CL3.

Also in this configuration, each of the control calculation units that is normal transmits alternative information in the in-system communication abnormal state, similarly to the above embodiments. As a modification of the sixth embodiment, each of the two actuators may have a four or more-system redundant configuration. In addition, a similar technical idea can be extended to a motor drive system including three or more actuators each having a three or more-system redundant configuration, the motor drive system being obtained by combining the fourth and fifth embodiments.

In addition, the connection form (topology) of the inter-system communication of three or more systems may be interpreted by replacing the connection forms of the inter-actuator communication illustrated in FIGS. 12A to 12D with the inter-system communication. That is, in the case of the ring type or the series type, the control calculation units of each system can communicate with the control calculation units of all the other systems via the control calculation units of at least another system. In the case of the star type, the control calculation units of one system directly communicates with the control calculation units of all the other systems. In the case of the mesh type, the control calculation units of each system directly communicates with the control calculation units of all the other systems. As described above, the connection form of the inter-system communication among three or more systems can be appropriately set according to the above basic forms or combinations thereof.

Other Embodiments (a) The motor drive systems of the present disclosure may be applied to, as an application example of a two-actuator system different from a steer-by-wire system of a vehicle, a two-actuator automatic turning system that independently turns left and right turning wheels of a self-driving vehicle. In addition, the motor drive systems of the present disclosure may be applied to a twin-motor type electric power steering system including two steering assist motors. Besides, the motor drive systems of the present disclosure may be applied, without being limited to vehicles, to other vehicles, general machines, and the like.

(b) In the above embodiments, information is redundantly input to the control calculation units in each actuator. In another embodiment, however, information may be redundantly input to the control calculation units only in one actuator. In addition, when there is no demand from the system, redundant input of information may not be performed in any system.

(c) Each of the motor drive systems of the present disclosure includes two or more actuators each having a redundant configuration to output torque. The motor drive system switches, on a system-by-system basis, stop or continuation of motor drive control by the control calculation units of the respective actuators through communication between the actuators. However, besides the actuators that are targets of this control, other electric actuators or hydraulic or pneumatic actuators that operate independently may exist in the entire system.

As described above, the present disclosure is not limited to the above embodiments at all, and can be implemented in various forms without departing from the gist of the present disclosure.

The control calculation units and the methods thereof described in the present disclosure may be realized by a dedicated computer provided by configuring a processor programmed to execute one or more of functions embodied by computer programs, and memories. Alternatively, the control calculation units and the methods thereof described in the present disclosure may be realized by a dedicated computer provided by configuring a processor with one or more dedicated hardware logic circuits. Alternatively, the control calculation units and the methods thereof described in the present disclosure may be realized by one or more dedicated computers configured by a combination of a processor programmed to execute one or more functions, memories, and a processor configured with one or more hardware logic circuits. The computer programs may be stored in a computer-readable non-transition tangible recording medium as instructions to be executed by the computer.

The present disclosure has been described in accordance with the embodiments. However, the present disclosure is not limited to the embodiments and structures. The present disclosure also encompasses various modifications and variations within the scope of equivalents. In addition, various combinations and forms, and other combinations and forms further including only one element, more elements, or less elements are also within the scope and spirit of the present disclosure.

What is claimed is:

1. A motor drive system comprising
a plurality of actuators including a first actuator and a second actuator each functioning as a motor configured to output torque, wherein
each of the first actuator and the second actuator includes
a plurality of control calculation units provided redundantly and each configured to perform a calculation related to a motor drive control, and
a plurality of motor drive units provided redundantly and each configured to drive based on a drive signal generated by a corresponding control calculation unit and output the torque,
a unit of a combination of the control calculation unit and the motor drive unit corresponding to each other in each of the first actuator and the second actuator is defined as a system, each of the first actuator and the second actuator includes a plurality of systems,
the system in the first actuator and the system in the second actuator corresponding to each other are paired,
the control calculation unit in the first actuator and the control calculation unit in the second actuator paired with each other perform transmission and reception of information with each other by an inter-actuator communication,
in each of the first actuator and the second actuator, the control calculation unit of each of the plurality of systems performs transmission and reception of information with each other by an inter-system communication,
a state where any one of the control calculation units becomes unable to perform transmission and reception of normal information in response that
(i) a failure occurs in a control calculation unit paired with the any one of the control calculation units, or in a control calculation unit of another system in the first actuator or the second actuator including the any one of the control calculation units, or
(ii) the inter-actuator communication or the inter-system communication is interrupted
is defined as an in-system communication abnormal state,
in the in-system communication abnormal state, a normal control calculation unit in which no failure occurs transmits, as alternative information, information that has been incapable of being transmitted by the normal control calculation unit and information that has been received from another normal control calculation unit for the inter-actuator communication, in addition to information which the control calculation unit transmits in a normal state, and
in the in-system communication abnormal state, when the normal control calculation unit receives the information including the alternative information, the normal control calculation unit continues the motor drive control using at least a part of the information received.

2. The motor drive system according to claim 1, wherein
in the in-system communication abnormal state, when the control calculation unit in which no failure occurs receives the information including the alternative information, the control calculation unit transmits, as the alternative information, only information that has been received from a control calculation unit with which the control calculation unit directly communicate, to another control calculation unit.

3. The motor drive system according to claim 1, wherein
in the in-system communication abnormal state, when the control calculation unit in which no failure occurs receives the information including the alternative information, the control calculation unit transmits, as the alternative information, information obtained by multiplying information for the inter-actuator communication in each of the plurality of systems by a predetermined ratio corresponding to each of the plurality of systems, to another control calculation unit.

4. The motor drive system according to claim 1, wherein,
in at least one of the first actuator and the second actuator, information is redundantly input to the control calculation units of the plurality of systems.

5. The motor drive system according to claim 1, wherein
the plurality of actuators further includes a third actuator,
the third actuator includes
a plurality of control calculation units provided redundantly and each configured to perform a calculation related to a motor drive control, and
a plurality of motor drive units provided redundantly and each configured to drive based on a drive signal generated by a corresponding control calculation unit and output the torque,
the control calculation unit of the third actuator perform transmission and reception of information with the control calculation unit of the first actuator or the second actuator by the inter-actuator communication,
a unit of a combination of the third control calculation unit and the third motor drive unit corresponding to each other is also defined as a system, the third actuator includes a plurality of systems,
the system in the first actuator, the system in the second actuator, and the system in the third actuator corresponding to each other are paired,
two of the control calculation unit in the first actuator, the control calculation unit in the second actuator, and the control calculation unit in the third actuator paired with each other perform transmission and reception of information with each other,
in each of the first actuator, the second actuator, and the third actuator, the control calculation unit of each of the plurality of systems performs transmission and reception of information with each other by the inter-system communication,
a state where any one of the control calculation units becomes unable to perform transmission and reception of normal information in response that
(i) a failure occurs in a control calculation unit paired with the any one of the control calculation units, or in a control calculation unit of another system in the first actuator, the second actuator, or the third actuator including the any one of the control calculation units, or
(ii) the inter-actuator communication or the inter-system communication is interrupted
is defined as the in-system communication abnormal state, and
in the in-system communication abnormal state, a normal control calculation unit in which no failure occurs transmits the alternative information, and the normal control calculation unit that receives the alternative information continues the motor drive control using at least a part of the information received.

6. The motor drive system according to claim 1, wherein,
in at least one of the first actuator and the second actuator, three or more systems are provided redundantly.

7. A motor drive system comprising
a first actuator and a second actuator each functioning as a motor configured to output torque, wherein each of the first actuator and the second actuator includes
- a plurality of processors provided redundantly and each configured to perform a calculation related to a motor drive control, and
- a plurality of motor drivers provided redundantly and each configured to drive based on a drive signal generated by a corresponding processor and output the torque, a unit of a combination of the processor and the motor driver corresponding to each other in each of the first actuator and the second actuator is defined as a system, each of the first actuator and the second actuator includes a plurality of systems, the system in the first actuator and the system in the second actuator corresponding to each other are paired, the processor in the first actuator and the processor in the second actuator paired with each other perform transmission and reception of information with each other by an inter-actuator communication, in each of the first actuator and the second actuator, the processor of each of the plurality of systems performs transmission and reception of information with each other by an inter-system communication, a state where a first processor of a first system becomes unable to perform transmission and reception of normal information in response that
- (i) a failure occurs in a second processor of a second system paired with the first processor or in a third processor of a third system in the first actuator or the second actuator including the first processor, or
- (ii) the inter-actuator communication or the inter-system communication is interrupted is defined as an in-system communication abnormal state, in the in-system communication abnormal state, a normal processor in which no failure occurs transmits, as alternative information, information that has been incapable of being transmitted by the normal processor and information that has been received from another normal processor for the inter-actuator communication, in addition to information which the normal processor transmits in a normal state, and in the in-system communication abnormal state, when the normal processor receives the information including the alternative information, the normal processor continues the motor drive control using at least a part of the information received.

* * * * *